Sept. 22, 1936. W. I. JONES 2,055,442

WALLBOARD STRUCTURE AND FASTENER

Filed Nov. 27, 1933

Inventor:
Walter I. Jones

Patented Sept. 22, 1936

2,055,442

UNITED STATES PATENT OFFICE 2,055,442

WALLBOARD STRUCTURE AND FASTENER

Walter I. Jones, Arlington, Mass., assignor to United-Carr Fastener Corporation, Cambridge, Mass., a corporation of Massachusetts Application November 27, 1933, Serial No. 699,914

3 Claims. (Cl. 72—118)

My invention aims to provide improvements in fastener-secured wallboard and the like installations and fasteners for the same.

In the drawing which illustrates a preferred embodiment of my invention:—

Referring to my invention, as illustrated by the annexed drawing, I have shown an installation which is particularly, though not exclusively, useful in connection with the construction of buildings having steel framework.

The particular illustration shown includes a frame member 1 (Fig. 3), herein shown as being in the form of a narrow beam, upon which is supported a sheet of wallboard 2 securely attached to the frame member 1 by a hook-like fastener.

Figure 4:
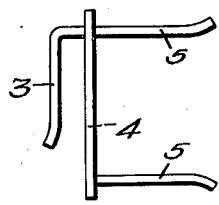
Fig. 4 is a side elevation of my improved fastener member before attachment.
Figure 5:
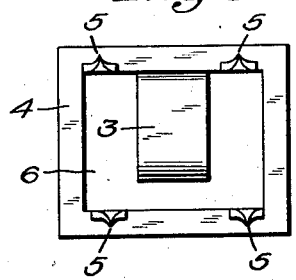
Fig. 5 is a plan view of the fastener member shown in Fig. 4.
Figure 6:
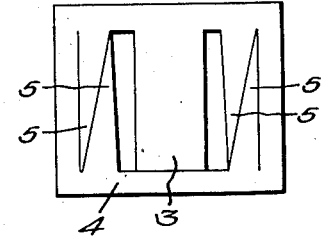
Fig. 6 is a plan layout showing the manner in which the fastener is blanked from a piece of sheet metal.

The fastener used in connection with the installation illustrated is preferably formed from a single piece of sheet metal and has a hook portion 3 located at one side of the plane of a base 4. A plurality of attaching prongs 5, having their extreme end portions normally bent outwardly, extend from the base 4 of the fastener at the opposite side from the hook. As illustrated in Figs. 4, 5 and 6, the fastener is provided with a base rectangular in outline (Fig. 5) and having a relatively large aperture 6 cut through the base. The hook 3 and attaching prongs 5 are formed from material cut out to provide the aperture 6, as best illustrated in Fig. 6. The hook 3 is formed from the central portion of the cut out material and extends downwardly from the edge of the aperture and then inwardly parallel with the base 4, as best illustrated in Fig. 4. The attaching prongs 5 are cut from material from opposite sides of the hook portion 3 in such a manner that when they are bent out of the plane of the base there are two sets of prongs one at each side of the hook and at opposite sides of the aperture 6, as best illustrated in Fig. 5.

Figure 1:
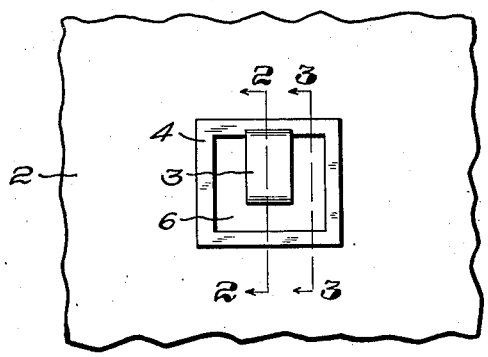
Figure 1 is a bottom view of a piece of wallboard with one of my improved fasteners attached thereto.
Figure 2:
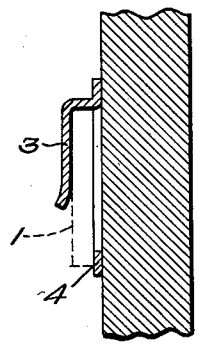
Fig. 2 is an enlarged section taken on the line 2—2 of Fig. 1, the outline of a supporting member being shown in dotted line.
Figure 3:
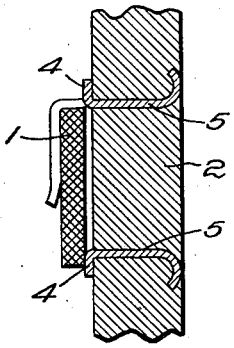
Fig. 3 is a section taken on the line 3—3 of Fig. 1, but including a cross-section of a supporting beam.

The method which I prefer to use in connection with assembling the parts of the installation described is as follows. First, the fastener is attached to the beam 1 by a lateral approaching motion so that the hook 3 will engage over the edge thereof, as shown in Fig. 3. The hook 3 is designed to engage securely the beam 1 and there is a certain amount of resiliency thereto so that it may adapt itself to variations in the thickness of the beam 1. When the fastener or fasteners are attached in this manner the base of each overlies the supporting structure 1 and the attaching prongs 5 extend away from the supporting structure at right angles thereto.

After the fastener members are hooked into position an entire sheet of wallboard 2 may be easily and quickly attached by forcing the wallboard against the attaching prongs 5. During this attaching operation the attaching prongs are forced through the wallboard 2 and when they reach the exposed surface their outwardly bent ends engage a suitable anvil in the form of a plate or mallet and are bent outwardly and back into the material of the wallboard, as shown in Fig. 3. Thus the wallboard is attached by a sort of nailing operation with the attaching prongs acting as nails but entering from the opposite side from that where nails would ordinarily be driven into place. The attaching prongs are practically concealed and the outer surface of the wallboard 2 remains practically imperforate and smooth.

My invention is simple, easy to assemble and requires a minimum amount of initial preparation, because wallboard is usually attached to a frame structure having numerous edges so that the fasteners may be hooked into position at almost any desired point without making provision for the fasteners. Therefore, it is merely necessary to supply the builder with the frame elements, the wallboard, and the fastener members which may be assembled without any particular skill.

While I have illustrated and described a preferred embodiment of my invention, I do not wish to be limited thereby because the scope of my invention is best defined by the following claims.

I claim:—

1. An installation of the class described comprising, in combination, a rigid supporting member, a covering member such as wallboard to be fastened to the supporting member and a unitary hook fastener device providing the only means for securing said covering member to said supporting member, said fastener having a base located between the two members, a hook extending from said base into hooked engagement with said supporting member, and attaching means extending from said base into positive attaching engagement with said covering member.

2. An installation of the class described comprising, in combination, a supporting member in the form of a strip of metal and the like, a relatively rigid covering member and a one-piece fastener securing said covering member to said supporting member, said fastener having a base located between the two members, an integral hook extending from said base over the edge of the supporting member to secure the fastener thereto and attaching means in the form of a plurality of prongs extending from said base into embedded relation with the covering member to secure the covering member in position.

3. A hook fastener formed from a single piece of sheet metal and having a base formed with a central aperture, a hook formed from the central portion of material of the base cut out to form the aperture and of less width than the aperture, said hook extending from one edge of the aperture, and attaching prongs formed from material cut out to provide the aperture at both sides of the hook, and said attaching prongs extending from the base at the edge of the aperture and in the opposite direction from the hook.

WALTER I. JONES